Aug. 21, 1945.  J. O. KLEBER  2,383,321
WEIGHING APPARATUS ADAPTED FOR OPERATION BY THE BLIND
Filed March 2, 1944
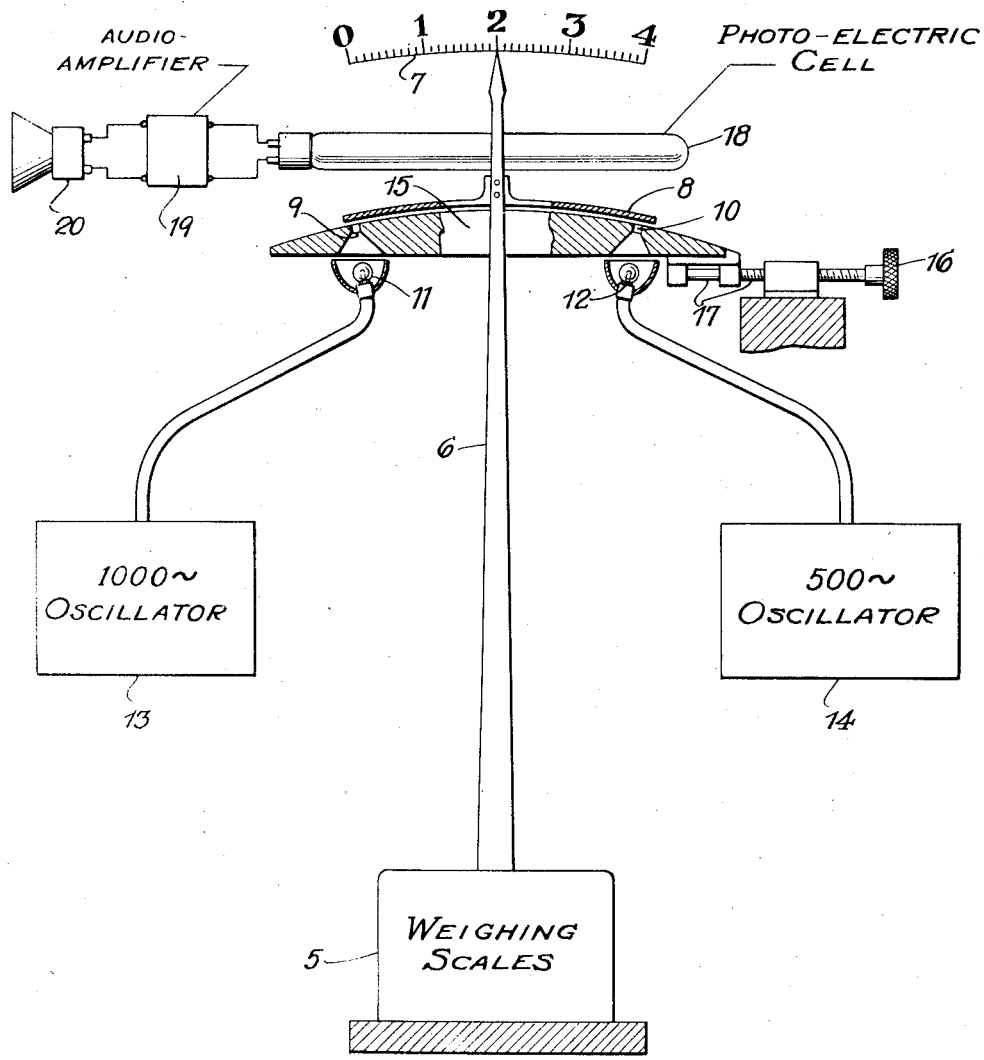
INVENTOR.
JACKSON O. KLEBER.
BY
Ward, Crosby + Neal
ATTORNEYS.

Patented Aug. 21, 1945

2,383,321

UNITED STATES PATENT OFFICE 2,383,321

WEIGHING APPARATUS ADAPTED FOR OPERATION BY THE BLIND

Jackson O. Kleber, Long Island City, N. Y.

Application March 2, 1944, Serial No. 524,724

2 Claims. (Cl. 177—311)

This invention relates to weighing apparatus adapted for operation by the blind, or without the aid of sight.

In the packaging of predetermined amounts of material or predetermined numbers of small articles, it is often convenient to determine by weight the desired quantity to be placed in each package. Where the conditions are such that the packaging may be economically done manually, the operation is one which is well adapted to be performed by the blind, except that so far as I am aware, no weighing apparatus has heretofore been available in a form adapted to be rapidly and accurately used by the blind.

In accordance with the present invention I have solved this problem by providing a photoelectric cell and loud speaker arrangement accompanying the weighing balance or scales and adapted to sound high or low audible frequency signals respectively when the weight indicated by the scales is higher or lower than the predetermined desired value, the signals also if desired being of a loudness indicative of the degree of over or under weight.

With this arrangement it has been found that a blind person with very little practice is able to operate the weighing scales or balance in very rapid succession for accurately weighing predetermined quantities of material or effectively counting small articles to be packaged. For example, the arrangement is being used by the blind in counting out predetermined numbers of phonograph needles or the like, which are to be packaged in envelopes. In this operation the photoelectric cell arrangement may be set to cause a relatively low audible frequency note to be sounded from the loud speaker when the balance pan is empty. Then as the needles or other articles are dropped on to the weighing pan, and as the number of articles approaches the desired predetermined number for one package, the signal may be arranged to decrease in intensity, and thus give a warning just as the number of articles on the weighing pan is about to approach the predetermined number for one packageful. When the predetermined number is reached, the arrangement may be such as to give no signal, and when the number becomes excessive, then a relatively higher audible note begins to sound with an intensity depending upon the amount or number in excess. Thus the psychological effect of the low and high frequency notes and the degree of intensity thereof when the weight is nearly correct, allows the blind person to gauge very quickly and accurately whether the weight is approaching or exceeding the desired amount, or is correct.

The use of high and low notes respectively to signify high or low weights, prevents any danger of confusion, mistake or misunderstanding of the signals, particularly when the weight is nearly correct and the signals are of low intensity.

Various further and more specific objects, features and advantages will more clearly appear from the detailed description given below taken in connection with the accompanying drawing which forms a part of this specification and illustrates somewhat schematically by way of example, a preferred form of the invention. The invention consists in such novel features, arrangements and combinations of parts as may be shown and described in connection with the apparatus herein disclosed.

In the figure, weighing scales are schematically indicated at 5, having a pointer as at 6 for cooperating with a graduated dial as at 7. These scales may be of any suitable known type or may be in the form of weighing balances having weighing pans, etc. A shutter member as at 8 may be affixed to the pointer 6 for cooperating with light apertures as at 9, 10, these apertures being flooded by light as from lamp bulbs 11 and 12. The lamp 11 may be connected for example with a suitable source of power included within an oscillator 13 which is arranged to cause variations in the lighting current, say at a frequency of 1000 cycles per second. Similarly, the lamp 12 may be connected to be lighted from another oscillator 14 adjusted to cause variations in the illumination of the lamp 12 at a lower frequency, say of 500 cycles.

The apertures 9 and 10 may be formed in a stationary plate or shield member as at 15, the position of which may be manually adjusted if desired as by turning a knob 16 having threaded connection means as at 17 with the member 15. An elongated photoelectric cell as at 18 may be suitably mounted above the shutter member 8 and connected through an audio amplifier 19 of known type to a loud speaker 20.

In the operation of the arrangement the aperture plate or shield member 15 is first adjusted to a position such that shutter 8 will close both apertures 9 and 10 when the scales or balance pointer is indicating a predetermined desired weight. The drawing shows the parts in this condition. At this time neither of the two oscillator frequencies will be heard in the loud speaker, since the light from the two lamps will be shielded by the shutter 8 from reaching the photoelectric cell. However, if the pointer indicates a value lower than the predetermined desired amount, then the variations from the lower audible frequency oscillator will be heard, since light from lamp 12 will be impinging upon the photoelectric cell. It is apparent that the intensity of the audible frequency note then heard will depend upon the proportion of the aperture 10 which is uncovered by the shutter. Thus, as the aperture becomes nearly covered, viz., as the weight indicated closely approaches the desired predetermined amount, the intensity of the low frequency note will correspondingly diminish until no note is heard when the pointer indicates the predetermined desired amount. Then if a slight excess quantity of material is placed on the scales, aperture 9 will be uncovered to a corresponding degree resulting in a 1000 cycle note in the loud speaker due to the light from lamp 11. If a certain degree of tolerance is permissible above or below the desired predetermined weight, the shutter 8 may be lengthened correspondingly so as to prevent any audible note of either frequency, whenever the weight indicated is within the tolerance limits.

The lamps 11 and 12 may be of a miniature filament type. While the intensity of the light from the filaments, due to inertia of the heating and cooling effect therein will not vary directly in accordance with the oscillator current, yet there will be sufficient variation in the light intensity and consequently in the photoelectric cell current as to give a soft readily audible note from the loud speaker at either of the two frequencies. In using the scales steadily, such a soft audible note is found desirable to avoid annoyance and mental fatigue. The blind person may quickly test the arrangement to determine whether it is in operative condition, by applying pressure to the weighing pan sufficient to cause the pointer to move from the low weight region to the high weight position, and vice versa.

With very little practice it has been found that a blind person using the above described arrangement is able to package small quantities or numbers of articles at least as accurately and rapidly as if the scale pointer were visible to the operator.

While the invention has been described in detail with respect to a particular preferred example, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. Weighing apparatus adapted for operation by the blind, comprising in combination, weighing scales having a movable member for indicating the weight, a light shutter member carried by said indicating member, a relatively fixed shutter member cooperating therewith, one of said shutter members having two apertures positioned to be both covered by the other shutter member when a predetermined weight is indicated, and to be alternatively uncovered respectively when a higher or lower weight is indicated, means for illuminating said apertures respectively with light having relatively high and low frequency variations, and means responsive to such light passing through said apertures for providing audible signals of corresponding high and low frequencies, whereby when the material on the scales weighs in excess of or less than the desired predetermined weight, the higher or lower frequency signals respectively will sound.

2. Weighing apparatus adapted for operation without the aid of sight, comprising in combination, weighing scales having a movable member for indicating the weight, a light shutter member carried by said indicating member, a relatively fixed shutter member cooperating therewith, one of said shutter members having two apertures positioned to be both substantially covered by the other shutter member when a predetermined weight is indicated, and to be alternatively uncovered to varying degrees corresponding to higher or lower weights respectively, means for illuminating said apertures respectively with light having relatively high and low frequency variations, and means responsive to such light passing through said apertures for providing audible signals of corresponding high and low frequencies and of a volume generally corresponding to the extent that the apertures are uncovered, whereby when the material being weighed exceeds or is less than the desired predetermined amount, the high or low frequency signals respectively will sound with a loudness indicative of the amount of the over or under weight.

JACKSON O. KLEBER.